C. C. MINOR.
PHOTOGRAPHIC OBJECTIVE.
APPLICATION FILED AUG. 18, 1916. RENEWED JULY 28, 1919.

1,360,667. Patented Nov. 30, 1920.

Witnesses:
Robert F. Weir
Arthur W. Carlson

Inventor:
Charles Clayton Minor
By Miller, Chindahl & Parker,
Attys.

UNITED STATES PATENT OFFICE.

CHARLES CLAYTON MINOR, OF CHICAGO, ILLINOIS.

PHOTOGRAPHIC OBJECTIVE.

1,360,667.      Specification of Letters Patent.      Patented Nov. 30, 1920.

Application filed August 18, 1916, Serial No. 115,673. Renewed July 28, 1919. Serial No. 313,828.

*To all whom it may concern:*

Be it known that I, CHARLES CLAYTON MINOR, a citizen of the United States, residing at Chicago, in the county of Cook and State of Illinois, have invented certain new and useful Improvements in Photographic Objectives, of which the following is a specification.

This invention relates to photographic objectives of the general class described in my prior Patents No. 1,077,420 and No. 1,098,823.

An object of this invention is to provide for the correction of all aberrations in a photographic objective.

Another object of this invention is to introduce a correction for the positive spherical aberration by an air space having the form of a positive lens.

Another object of this invention is the production of an objective with a negative lens of such formation and in such relation to the other lenses that the telephoto effect is attained.

Another object of this invention is the production of an objective which will be satisfactory in exceptional cases where the light is uncertain or ordinarily insufficient.

With the foregoing and other objects in view, the invention consists of a number of lenses of selected glass and curvatures placed in rather close proximity to each other, one of the lenses being of decidedly negative focus.

In my Patent No. 1,098,823 the much desired tele-photo effect is attained by the lens system therein described. Its use, however, results in considerable positive spherical aberration which is corrected for by means of the facing surfaces forming spaces of the form of a positive lens, the spaces being located between the three rear lenses. The combination of the first three lenses of my present invention is somewhat similar to the first three lenses in the patent referred to, but by the selective use of glass and curvatures the positive spherical aberration mentioned is herein entirely corrected by the combination of the first three lenses.

Figure 1:
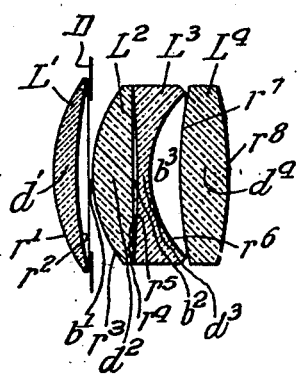
Figure 2:
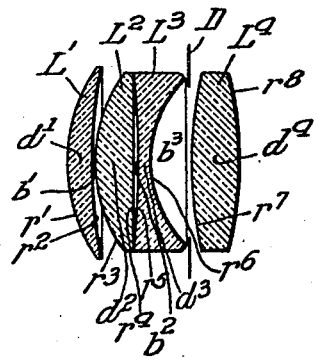
Figure 3:
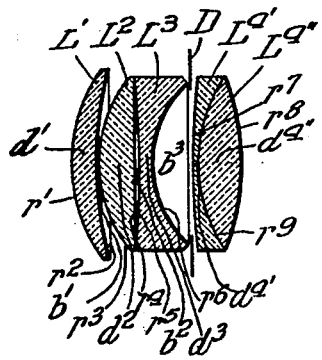
Figure 4:
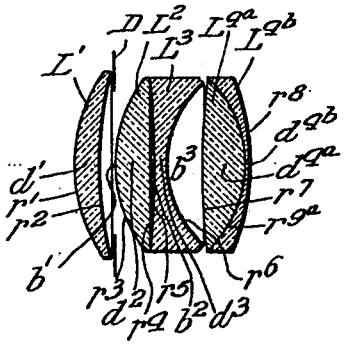

In the accompanying drawings Figure 1 is a diagrammatic sectional view of an objective comprising lenses embodying my invention. Fig. 2 is a similar view of Fig. 1 showing the diaphragm in a second position. Fig. 3 is a similar view of a modification of the form shown in Fig. 1. Fig. 4 is a view somewhat similar to Fig. 3 but showing the diaphragm in a second position.

In all the drawings the two forward lenses $L^1$ and $L^2$ are of axial thickness $d^1$ and $d^2$ respectively, have the radii $r^1$, $r^2$, $r^3$ and $r^4$ respectively, and are separated by an air space $b'$. The third lens $L^3$ is of axial thickness $d^3$ and the radii of curvature are $r^5$ and $r^6$. The space $b^2$ separates the lenses $L^3$ and $L^2$ and the space $b^3$ separates the lens $L^3$ from the lens $L^4$ which is of axial thickness $d^4$ and with radii of curvature $r^7$ and $r^8$. In Figs. 3 and 4 the lens $L^4$ is replaced by a doublet of lenses. In Fig. 3 the doublet lenses $L^{4\prime}$ and $L^{4\prime\prime}$ are of axial thickness $d^{4\prime}$ and $d^{4\prime\prime}$ and with the radii of curvature $r^7$ and $r^8$, respectively, and with a common radius $r^9$. In Fig. 4 the doublet lenses $L^{4a}$ and $L^{4b}$ are of axial thickness $d^{4a}$ and $d^{4b}$ and with radii of curvature $r^7$ and $r^8$, respectively, and with a common radius $r^{9a}$.

The two forward lenses $L^1$ and $L^2$ are of strong positive focus and of relatively low dispersive power, being preferably of crown glass. They are placed in the combination with their convex surfaces facing the incident rays. The third or negative lens $L^3$ of the combination is of double concave form and of relatively high dispersive and high refractive power, being preferably of dense flint glass. The fourth lens $L^4$, which may be of crown glass, is of positive focus and of relatively low dispersive power.

The radius of curvature ($r^6$) of the posterior surface of lens $L^3$ is the shortest of any lens surface of the system.

The combination of the three lenses $L^1$, $L^2$ and $L^3$ in itself produces the tele-photo effect. This condition results in the optical center of the system being nearer the incident rays than in the ordinary system where it is about in the middle of the system. Since their computed combined focal length is greater than the amount of racking out ascertained by trial, the actual focus of the lens system is relatively close to the rear lens of the system.

The lenses $L^2$ and $L^3$ constitute an uncemented doublet, said lenses being formed so that their facing surfaces shall have slightly differing radii. This formation, in conjunction with the other properties of the three lenses $L^1$, $L^2$ and $L^3$, corrects the positive spherical aberration, or may even create a slight amount of negative spherical aberration.

Recent photographic experience has shown that high apertures with as much depth of field as is possible is the most desirable condition. Although the three lenses $L^1$, $L^2$ and $L^3$ may be corrected in themselves so as to form a lens system of fair optical performance, the system would be only of a relatively moderate aperture. The addition of the fourth lens $L^4$, however, produces a lens system corrected to a very much larger aperture.

The four lenses shown in Figs. 1 and 2 provide sufficient correction for very acceptable optical performance, but for the further correction of possible outstanding errors, the modified objective shown in Figs. 3 and 4 may be used. The lens $L^4$ is replaced by a cemented doublet of two lenses $L^{4\prime}$ and $L^{4\prime\prime}$ or $L^{4a}$ and $L^{4b}$ of different refractive powers. These latter combinations provide corrective power for neutralizing any possible outstanding errors.

The diaphragm D may be placed at any suitable point of the system. Herein I have shown it in two different positions, between the lenses $L^1$ and $L^2$ in Figs. 1 and 4, between the lenses $L^3$ and $L^4$ in Fig. 2 and between the lenses $L^3$ and $L^{4\prime}$ in Fig. 3.

One example of the type of objective shown in Fig. 2 is given below.

| Radius in millimeters. | Thickness of lenses and spaces between lenses in millimeters. |
|---|---|
| $r^1+$ 37.0 | $d^1$ for lens $L^1$ ........ 4.34 |
| $r^2+$ 76.0 | Space $b^1$ ........ .05 |
| $r^3+$ 31.5 | $d^2$ for lens $L^2$ ........ 6.90 |
| $r^4$ ∞ | Space $b^2$ ........ 1.20 |
| $r^5-$ 160.0 | $d^3$ for lens $L^3$ ........ 3.20 |
| $r^6+$ 22.5 | Space $b^3$ ........ 10.00 |
| $r^7+$ 80.0 | $d^4$ for lens $L^4$ ........ 7.24 |
| $r^8-$ 72.0 | |

The refractive indices $n^C$, $n^D$ and $n^F$ relating to the C, D, and F lines respectively of the solar spectrum and the dispersion $y$ for the different kinds of glass I have used in this example are:

|  | Lens $L^1$. | Lens $L^2$. | Lens $L^3$. | Lens $L^4$. |
|---|---|---|---|---|
| $n^C$ | 1.6088 | 1.51446 | 1.61205 | 1.56967 |
| $n^D$ | 1.6120 | 1.5170 | 1.6169 | 1.5726 |
| $n^F$ | 1.61963 | 1.52305 | 1.62896 | 1.57962 |
| $y$ | 56.6 | 60.2 | 36.4 | 57.4 |

Focal distance 65 mm.; diameter of largest lens 38 mm.; effective aperture .5 or $f^2$; anastigmatically flattened field about 65°.

One example of the type of objective shown in Fig. 3 is given below.

| Radius in millimeters. | Thickness of lenses and spaces between lenses in millimeters. |
|---|---|
| $r^1+$ 32.2 | $d^1$ for lens $L^1$ ........ 5.16 |
| $r^2+$ 79.0 | Space $b^1$ ........ .05 |
| $r^3+$ 27.6 | $d^2$ for lens $L^2$ ........ 7.26 |
| $r^4$ ∞ | Space $b^2$ ........ 0.90 |
| $r^5-$ 150.0 | $d^3$ for lens $L^3$ ........ 2.70 |
| $r^6+$ 22.0 | Space $b^3$ ........ 8.00 |
| $r^7+$ 210.0 | $d^{4\prime}$ for lens $L^{4\prime}$ .... 1.15 |
| $r^8-$ 48.0 | $d^{4\prime\prime}$ for lens $L^{4\prime\prime}$ .... 8.40 |
| $r^9+$ 35.0 | |

The refractive indices $n^C$, $n^D$ and $n^F$ and the dispersion $y$ for the different kinds of glass I have used in this example are:

|  | Lens $L^1$. | Lens $L^2$. | Lens $L^3$. | Lens $L^{4\prime}$. | Lens $L^{4\prime\prime}$. |
|---|---|---|---|---|---|
| $n^C$ | 1.5372 | 1.51446 | 1.61205 | 1.56967 | 1.51446 |
| $n^D$ | 1.5399 | 1.5170 | 1.6169 | 1.5726 | 1.5170 |
| $n^F$ | 1.54629 | 1.52305 | 1.62896 | 1.57962 | 1.52305 |
| $y$ | 60.2 | 60.2 | 36.4 | 57.4 | 60.2 |

Focal distance 65 mm.; diameter of largest lens 38 mm.; effective aperture .5 or $f^2$; anastigmatically flattened field about 80°.

One example of the type of objective shown in Fig. 4 is given below.

| Radius in millimeters. | Thickness of lenses and spaces between lenses in millimeters. |
|---|---|
| $r^\prime +$ 32.0 | $d^\prime$ for lens $L^\prime$ ........ 5.16 |
| $r^2 +$ 79.0 | Space $b^\prime$ ........ 3.00 |
| $r^3 +$ 27.6 | $d^2$ for lens $L^2$ ........ 7.26 |
| $r^4$ ∞ | Space $b^2$ ........ 0.90 |
| $r^5 -$ 150.0 | $d^3$ for lens $L^3$ ........ 2.70 |
| $r^6 +$ 22.0 | Space $b^3$ ........ 7.03 |
| $r^7 +$ 210.0 | $d^{4a}$ for lens $L^{4a}$ .... 8.55 |
| $r^8 -$ 48.0 | $d^{4b}$ for lens $L^{4b}$ .... 1.00 |
| $r^{9a} -$ 22.5 | |

The refractive indices $n^C$, $n^D$ and $n^F$ and the dispersion $y$ for the different kinds of glass I have used in this example are:

|  | Lens $L^1$. | Lens $L^2$. | Lens $L^3$. | Lens $L^{4a}$. | Lens $L^{4b}$. |
|---|---|---|---|---|---|
| $n^C$ | 1.5372 | 1.51446 | 1.61205 | 1.56967 | 1.51446 |
| $n^D$ | 1.5399 | 1.5170 | 1.6169 | 1.5726 | 1.5170 |
| $n^F$ | 1.54629 | 1.52305 | 1.62896 | 1.57962 | 1.52305 |
| $y$ | 60.2 | 60.2 | 36.4 | 57.4 | 60.2 |

Focal distance 65 mm.; diameter of largest lens 38 mm.; effective aperture .5 or $f^2$; anastigmatically flattened field about 80°.

The dispersion values given in the foregoing tables have been calculated from the following formula:

$$\frac{n^D - 1}{n^F - n^C} = y$$

In all of the foregoing examples it will be understood that the dimensions given are only approximately correct.

I would have it further understood that unless otherwise specifically described the refractive indices of the various lens elements may have a considerable range, such as from 1.51 to 1.62 for $n^D$.

I claim as my invention:

1. In a photographic objective, a system of three lenses receiving the incident rays comprising two adjacent positive lenses and a negative lens, one of the positive lenses being separated from the negative lens by a space of positive form.

2. In a photographic objective, a system of three lenses receiving the incident rays comprising two adjacent positive lenses and a negative lens, the negative lens being separated from the positive lens nearest it by an air space of positive form, said negative lens and the adjacent positive lens having their facing surfaces of slightly different radii whereby a correction for the positive spherical aberration may be attained.

3. In a photographic objective, two adjacent positive lenses, and a third negative lens, the second positive lens and the negative lens forming an uncemented doublet and being separated by a space of positive form.

4. A photographic objective comprising four lenses, the first two lenses being positive and located adjacent each other and the third lens being negative, the second positive lens and the negative lens being separated by an air space of positive form and having their facing surfaces of slightly different radii whereby a correction for the positive spherical aberration may be attained, and the fourth lens being positive.

5. A photographic objective having, in combination, two consecutive positive lenses of low dispersion with their convex surfaces arranged to face the incident rays, a double concave lens of high refraction and high dispersion, and a positive lens of low dispersion.

6. A photographic objective having, in combination, two consecutive positive lenses of low dispersion with their convex surfaces arranged to face the incident rays, a double concave lens of high refraction and high dispersion, and a cemented lens of positive focus.

7. A photographic objective having, in combination, two lenses of relatively low dispersive power and relatively strong positive focus, a third lens of relatively high dispersive power and relatively strong negative focus, the radius of curvature of the posterior surface of said third lens being the shortest of any lens surface in the objective, and a positive lens of low dispersion.

8. A photographic objective having, in combination, two lenses of relatively low dispersive power and relatively strong positive focus, a third lens of relatively high dispersive power and relatively strong negative focus, the radius of curvature of the posterior surface of said third lens being the shortest of any lens surface in the objective, and a cemented lens of positive focus.

9. A photographic objective having, in combination, four lenses only, one being a positive lens of low dispersion, two others being an uncemented doublet of combined negative focus comprising a positive lens of relatively low refractive and dispersive power and a negative lens of relatively high dispersive and refractive power, and the fourth being a cemented lens of positive focus.

10. A photographic objective having, in combination, a meniscus convex lens of positive focus, an intermediate uncemented doublet of combined negative focus comprising a positive lens of relatively low refractive and dispersive power and a negative lens of relatively high dispersive and refractive power, and a doublet of positive focus.

11. A photographic objective having, in combination, a positive crown glass lens, a doublet of combined negative focus comprising a crown glass lens of relatively low refractive and dispersive power and a flint glass lens of strong negative focus with high refractive and dispersive power, with their facing surfaces having different radii and being in close proximity to each other, the convex surfaces of both crown lenses being adapted to face the incident rays, and a crown glass lens.

12. A photographic objective having, in combination, a positive crown glass lens, a doublet of combined negative focus comprising a crown glass lens of relatively low refractive and dispersive power and a flint glass lens of strong negative focus with high refractive and dispersive power, with their facing surfaces having different radii and being in close proximity to each other, the convex surfaces of both crown lenses being adapted to face the incident rays, and a cemented doublet consisting of lenses having different refractive indices.

13. A photographic objective comprising four lenses, two of the first three being positive and the other of the first three being negative, there being an air space of the form of a positive lens between two of the first three lenses.

In testimony whereof I have hereunto set my hand.

CHARLES CLAYTON MINOR.